Patented July 10, 1945

2,380,239

UNITED STATES PATENT OFFICE 2,380,239

ADHESIVES

Arthur M. Howald, Toledo, Ohio, assignor, by mesne assignments, to Libbey-Owens-Ford Glass Company, a corporation of Ohio No Drawing. Application July 10, 1941, Serial No. 401,797

6 Claims. (Cl. 117—161)

The invention relates to a method of preparing adhesives that can be used in the production of laminated structures of complicated shape, such as airplane sections. In the production of curved structural shapes from plywood, wooden plies having their contacting surfaces coated with an adhesive are bent about the surface of a form having the desired shape, and are then firmly held in place on the form while the adhesive sets. A wooden form supporting the plies is usually encased in an airtight rubber bag, which is evacuated and then placed in an autoclave so that pressure can be applied to compress the plies firmly against the form during the setting of the adhesive.

In the production of shapes for use in airplanes and in other applications in which water resistance is required, it is necessary to use a heat-hardening adhesive which sets to an insoluble resin. Phenolic resin adhesives are not very satisfactory for the production of curved plywood shapes because of the high temperature at which such adhesives set. When phenolic adhesives are used in the production of curved plywood shapes by the autoclave method, the high temperature that is necessary to harden the adhesives causes rapid deterioration of the bags in which the plywood shapes are enclosed during the autoclave treatment, and the expense of frequently replacing the bags is prohibitive even when the bags are made of heat-resistant synthetic rubber.

Urea-formaldehyde adhesives have excellent possibilities for use in the production of curved plywood shapes by the autoclave method, because such adhesives become converted into an insoluble resin at a much lower temperature than is necessary to cause the setting of phenolic adhesives. The temperatures that can be used in hardening urea-formaldehyde adhesives are low enough so that rapid deterioration of the bags does not occur even when they are made of ordinary rubber. Moreover, the life of the wooden forms is longer, and the plywood products themselves are of better quality with the use of these lower temperatures, which are not great enough to cause appreciable deterioration of the wood.

The difficulty with the urea-formaldehyde adhesives heretofore known is that they begin to set up soon after they have been coated on a surface to be glued, even when the coating is dried immediately after being applied. Wooden plies that have their opposing surfaces coated with a urea-formaldehyde adhesive cannot be bonded together by the application of heat and pressure after the urea-formaldehyde adhesive has set or become converted into an infusible resin. In order to cause the plies to become bonded together, the heat and pressure must be applied while the adhesive is still fusible, and before it has hardened or set, so that the adhesive can fuse and thus bond the plies together prior to setting under heat and pressure.

In the production of curved plywood shapes by autoclave gluing, it is necessary to place the successive superimposed plies upon the form with great care, and to fasten them securely in place in order to prevent buckling, separation, or other displacement of the plies. Thus the building up of the curved layer of plies on the form takes considerable time. Care must also be exercised in placing the rubber bag over the plies and the supporting form. For these reasons, many hours may elapse between the time when the adhesive is spread upon the first ply to be placed on the form and the time when the hardening temperature is attained in the autoclave. Since the urea-formaldehyde adhesives heretofore known begin to set up within a few hours after being applied, they are generally unsatisfactory for use in the production of curved plywood shapes.

The principal object of the invention is the preparation of a dry coating of urea-formaldehyde adhesive that remains stable for several days so as to permit wooden plies coated therewith to be bonded together under heat and pressure several days after the coating has been applied. More specific objects and advantages are apparent from the description, which merely discloses and illustrates the invention and is not intended to impose limitations upon the claims.

In accordance with the invention, a wooden ply or other surface to be glued may be provided with a dry layer of heat-setting adhesive that remains stable for an extended period by preparing an aqueous solution of a urea-formaldehyde condensation product containing substantially no free formaldehyde, and applying the solution to the surface together with a polyhydric phenol and an ammonium salt of a strong acid, and drying. An adhesive coating so prepared remains stable for a week or more, depending on the atmospheric temperature, so that wooden plies so coated can be bonded together by applying heat and pressure a week after the application of the coating to the plies. The stability of the layer is not gained at the expense of the hardening speed of the adhesive, and a stable coating of adhesive prepared in accordance with the invention is rapidly hardened to an infusible resinous bond when the coating is compressed between the surfaces to be glued at the moderate temperatures, approximating 200° F., which are ordinarily employed in hardening urea-formaldehyde adhesives.

Formaldehyde and urea react in molar ratios as high as 2:1. Even when 2 or less mols of formaldehyde are condensed with 1 mol of urea in aqueous solution, however, the resulting solution of the condensation product normally contains a small concentration of free formaldehyde. Such free formaldehyde is not a mere uncombinable excess of formaldehyde such as would result from the use of more than 2 mols of formaldehyde for each mol of urea, but is a normal accompaniment of every urea-formaldehyde condensation product in aqueous solution, and is in equilibrium with the condensation product.

The aqueous solution of a urea-formaldehyde condensation product containing substantially no free formaldehyde, which may be used in carrying out the invention, is thus in a state of unstable equilibrium. After this solution has been applied to the surface to be glued, together with a polyhydric phenol and an ammonium salt of a strong acid, and dried, there is a tendency of a restoration of the normal equilibrium concentration of free formaldehyde, so that formaldehyde is gradually liberated from the urea-formaldehyde condensation product in the dried layer.

If no polyhydric phenol were present in the dried layer, the formaldehyde, as fast as it was liberated, would react with the ammonium salt in the layer, thereby converting the ammonium salt into the hexamethylenetetramine salt, which is much more acid than the ammonium salt. The reaction of the liberated formaldehyde with the ammonium salt would use up the formaldehyde as fast as it was liberated, and would thus prevent the accumulation of any appreciable concentration of free formaldehyde, and thereby promote the liberation of formaldehyde from the urea-formaldehyde condensation product. Since the rate of liberation of formaldehyde from the urea-formaldehyde condensation product increases with its acidity, an increase in the acidity of the layer by liberation of free formaldehyde and conversion of the ammonium salt to the hexamethylenetetramine salt is an accelerating one. The increasing acidity of the layer would then cause the setting or hardening of the urea-formaldehyde condensation product to commence a few hours after the application of the layer.

It is not feasible to incorporate any substantial quantity of a base in the adhesive layer for the purpose of retarding the setting of the adhesive by neutralizing the first portion of the hexamethylenetetramine salt that is formed, because any substantial quantity of a base that is incorporated in the adhesive layer reduces the ultimate acidity that is attained by the layer during hot-pressing, and thereby prevents the adhesive from hardening satisfactorily.

However, when an aqueous solution of a urea-formaldehyde condensation product containing substantially no free formaldehyde is applied in a layer together with a polyhydric phenol and an ammonium salt of a strong acid, and dried, in accordance with the invention, the resulting layer suffers substantially no increase in acidity, and therefore remains stable, for a week or more. In the layer so prepared, the urea-formaldehyde condensation product liberates formaldehyde in the usual manner, but the polyhydric phenol is much more reactive with formaldehyde than the ammonium salt, so that the polyhydric phenol must be all used up by reaction with the liberated formaldehyde before the reaction of any appreciable quantity of the liberated formaldehyde with the ammonium salt occurs.

The remarkable stability that has been described is exhibited by an adhesive prepared in accordance with the invention only after the adhesive has been dried, because the liberation of formaldehyde from the urea-formaldehyde condensation product is much more rapid when the adhesive is in the form of a solution than it is when the adhesive has been reduced to dry form. Thus if the polyhydric phenol and the ammonium salt of a strong acid were simply added to an aqueous solution of a urea-formaldehyde condensation product containing substantially no free formaldehyde, the relatively rapid liberation of formaldehyde in the solution would cause the polyhydric phenol to be used up and the hardening of the adhesive to be started after a period of 8 to 24 hours. Before the hardening has begun, a solution so prepared can be applied as an adhesive and dried. In that way, an adhesive layer is produced in accordance with the invention that remains stable for an extended period after drying. The action of the polyhydric phenol in delaying the formation of the acid hexamethylenetetramine salt in the solution is important because it makes it possible for the operator to apply the solution and dry it before any appreciable quantity of such salt is formed. When that is done, the resulting dry layer of adhesive is not acid, and is therefore stable.

A dry layer of adhesive, as distinguished from a film of adhesive solution, is advantageous for autoclave gluing, because a film of adhesive solution during the hardening operation gives off vapor, which tends to destroy the vacuum in the rubber bag containing the work. Such vapor must be removed during the hardening operation by a vacuum line connected to the rubber bag. Although a dry layer of adhesive prepared in accordance with the invention is not tacky at ordinary temperatures, it fuses at the hardening temperature, and thus seals and bonds the opposing surfaces together.

The preferred method of preparing an aqueous solution of a urea-formaldehyde condensation product consists in condensing urea and formaldehyde in aqueous solution to produce an aqueous solution of condensation product containing the usual content of free formaldehyde, and then reacting such free formaldehyde with a formaldehyde-fixing agent. A formaldehyde-fixing agent is a substance that "fixes" formaldehyde, i. e., reacts with formaldehyde to prouce a relatively stable product. Formaldehyde-fixing agents that may be employed are melamine, polyhydric phenols such as resorcinol, catechol, quinol, pyrogallol, oxyhydroquinone, phloroglucinol, and their methyl derivatives, but the preferred fixing agents are urea and thiourea. The reaction of the free formaldehyde in the solution with a fixing agent may take several hours, and is preferably carried out in a substantially neutral solution.

The application of the aqueous solution of the urea-formaldehyde condensation product together with the polyhydric phenol and the ammonium salt of the strong acid may be carried out by any of the various methods of coating, such as spraying, brushing, or spreading by means of rolls. The polyhydric phenol and the ammonium salt may be applied in the form of solutions separate from the solution of the urea-formaldehyde condensation product, and the three solutions may be applied in any desired order, or may be sprayed simultaneously onto the same surface from separate nozzles. In addition, any two of the three solutions may be combined and applied as a single solution. However, it is obvious that the polyhydric phenol should not be added to the urea-formaldehyde condensation product long before or long after the ammonium salt of the strong acid is added, because the primary purpose of the polyhydric phenol is to delay the conversion of the ammonium salt into the hexamethylenetetramine salt.

When an adhesive layer prepared in accordance with the invention is compressed at the hardening temperature between the surfaces to be glued, it hardens very rapidly into a bond of infusible water-resistant resin, because the rapid liberation of formaldehyde from the urea-formaldehyde condensation product, which occurs at the hardening temperature, converts a large amount of the ammonium salt into the hexamethylenetetramine salt, to provide the acidity necessary for rapid hardening. The reaction product of the polyhydric phenol and formaldehyde which is present in the adhesive does not interfere in any way with the hardening, and itself hardens to an infusible water-resistant resin, which enhances the properties of the adhesive bond.

The invention may also be carried out by reacting a formaldehyde-fixing agent with a substantial proportion of the free formaldehyde present in an aqueous solution of a urea-formaldehyde condensation product, then applying the resulting solution to the surface to be glued, together with an ammonium salt of a strong acid and a quantity of a polyhydric phenol greater than that which will combine with the free formaldehyde remaining in the solution, and drying. In that case, the polyhydric phenol immediately reacts with the free formaldehyde remaining in the solution, and the excess of the polyhydric phenol then stabilizes the dried adhesive layer for an extended period, by reacting with the formaldehyde as it is liberated from the urea-formaldehyde condensation product, and thus delaying the formation of the acid hexamethylenetetramine salt.

After the preparation of an aqueous solution of a urea-formaldehyde condensation product which contains substantially no free formaldehyde, or in which a substantial proportion of the free formaldehyde has been reacted with a formaldehyde-fixing agent, the reduced content of free formaldehyde may be preserved for a time by spray-drying or vacuum drum-drying the solution, particularly if the product is kept neutral, although formaldehyde is very gradually liberated from the dry product so produced. The dry product so prepared may be dissolved in water as needed, to produce an aqueous solution containing substantially less than the normal concentration of free formaldehyde, which can be applied together with a polyhydric phenol and an ammonium salt of a strong acid in carrying out the invention.

When a solution of a urea-formaldehyde condensation product for use in carrying out the invention is prepared by reacting a formaldehyde-fixing agent with free formaldehyde in an aqueous solution of the urea-formaldehyde condensation product, a sufficient quantity of the fixing agent should be employed to react with a substantial proportion of the free formaldehyde present in the solution. Preferably the quantity of fixing agent is sufficient to react with substantially all the free formaldehyde, in order to reduce to a minimum the quantity of the polyhydric phenol required to produce a given delay in the setting of the adhesive layer. This is true because urea and thiourea, which are cheaper than polyhydric phenols, can be used as fixing agents, and because the employment of insufficient urea or thiourea to fix all the free formaldehyde in the solution would make it necessary to use just that much more of the polyhydric phenol in order to secure the same result. An excess of fixing agent above that required to fix all the free formaldehyde in the aqueous solution of the urea-formaldehyde condensation product may be employed, but is not necessary.

The quantity of water employed in the adhesive is simply an amount which gives the desired viscosity. The proportion of the ammonium salt of the strong acid is simply the proportion that will cause the urea-formaldehyde condensation product to set with the desired rapidity at the hardening temperature. The ammonium salt of a strong acid may be ammonium sulphate or ammonium bromide, but ammonium chloride is preferred. As the polyhydric phenol, catechol, quinol, pyrogallol, oxyhydroquinone, phloroglucinol, or one of their methyl derivatives may be employed, but resorcinol is preferred. The amount of the polyhydric phenol is simply a quantity that gives the desired delay in the setting of the adhesive layer after it has been applied.

In carrying out the invention, the dry layer of adhesive is preferably prepared in a substantially neutral condition so that it may have maximum stability and yet attain the maximum acidity during the hardening operation. Thus when the solution of the urea-formaldehyde condensation product is neutral, it is desirable to add a sufficient amount of basic material such as borax, sodium phosphate, or the like, to compensate for the acidity of the polyhydric phenol and the ammonium salt, and produce a neutral adhesive.

Any water-soluble urea-formaldehyde condensation product may be employed in carrying out the invention. A suitable condensation product may be prepared as follows: 1 mol of urea is added to a 37% aqueous solution containing 2 mols of formaldehyde that has been brought to a pH between 5 and 6 by the addition of sodium hydroxide. The solution is then refluxed until the desired viscosity has been attained. If the condensation product is desired in dry form for the purpose of shipment or storage, the resulting solution may be neutralized and diluted with water or evaporated under vacuum to bring it to the proper concentration for spray-drying, vacuum drum drying, or any other method of drying that is to be employed. A filler or extender, such as rye flour or wheat flour, may be incorporated if desired. The condensation product is more stable in dry form than in the form of a solution, and in any case is most stable in a neutral condition.

*Example*

100 parts of a dry neutral urea-formaldehyde condensation product, prepared in the manner hereinbefore described, are dissolved in 30 parts of water, and a sufficient quantity of urea (about 12 parts) to react with the free formaldehyde in the solution is added. The resulting solution is allowed to stand for twenty-four hours while the reaction takes place and the odor of formaldehyde from the solution disappears. 15 parts of resorcinol and 3 parts of ammonium chloride are then dissolved in 15 parts of water, and sufficient borax is added to neutralize the solution. The two solutions are then mixed, producing an adhesive having a suitable viscosity for spreading. The resulting solution should be spread upon a surface to be glued, and dried, within eight hours after it is prepared. The resulting adhesive layer may be hardened at any time within one week after it has been applied, by pressing the opposing surfaces together and heating to approximately 200° F.

Various embodiments of the invention may be devised to meet various requirements.

Having described my invention, I claim:

1. A method of preparing a dry heat-setting adhesive that remains stable for an extended period, which comprises applying an aqueous solution of a urea-formaldehyde condensation product, containing substantially no free formaldehyde, to a surface together with an ammonium salt of a strong acid and a quantity of a polyhydric phenol sufficient to delay appreciably the reaction of the ammonium salt with formaldehyde liberated from the urea-formaldehyde condensation product, and drying.

2. A method of preparing a dry heat-setting adhesive that remains stable for an extended period, which comprises preparing a urea-formaldehyde condensation product, reacting a formaldehyde-fixing agent with a substantial proportion of the free formaldehyde accompanying the condensation product, applying the resulting product in aqueous solution to a surface together with an ammonium salt of a strong acid and an excess of a polyhydric phenol, above the amount that will combine with the free formaldehyde in the solution, sufficient to relay appreciably the reaction of the ammonium salt with formaldehyde liberated from the urea-formaldehyde condensation product, and drying.

3. A method of preparing a dry heat-setting adhesive that remains stable for an extended period, which comprises preparing an aqueous solution of a urea-formaldehyde condensation product containing substantially no free formaldehyde, applying the solution to a surface together with ammonium chloride and a quantity of resorcinol sufficient to delay appreciably the reaction of the ammonium salt with formaldehyde liberated from the urea-formaldehyde condensation product, and drying.

4. A method of preparing a dry heat-setting adhesive that remains stable for an extended period, which comprises preparing a urea-formaldehyde condensation product, reacting material selected from the group consisting of urea and thiourea with a substantial proportion of the free formaldehyde accompanying the condensation product, applying the resulting product in aqueous solution to a surface together with an ammonium salt of a strong acid and an excess of resorcinol, above the amount that will combine with the free formaldehyde in the solution, sufficient to delay appreciably the reaction of the ammonium salt with formaldehyde liberated from the urea-formaldehyde condensation product, and drying.

5. A method of preparing a dry heat-setting adhesive that remains stable for an extended period, which comprises preparing an aqueous solution of a urea-formaldehyde condensation product, adding a sufficient quantity of material selected from the group consisting of urea and thiourea to react with substantially all the free formaldehyde in the solution and allowing the solution to stand in a substantially neutral condition until the reaction has taken place, applying the solution to a surface together with an ammonium salt of a strong acid and a quantity of resorcinol sufficient to delay appreciably the reaction of the ammonium salt with formaldehyde liberated from the urea-formaldehyde condensation product, in a substantially neutral condition, and drying.

6. A method of preparing a dry heat-setting adhesive that remains stable for an extended period, which comprises preparing an aqueous solution of a urea-formaldehyde condensation product, adding a sufficient quantity of material selected from the group consisting of urea and thiourea to react with substantially all the free formaldehyde in the solution and allowing the solution to stand in a substantially neutral condition until the reaction has taken place, adding ammonium chloride, a quantity of resorcinol sufficient to delay appreciably the reaction of the ammonium salt with formaldehyde liberated from the urea-formaldehyde condensation product, and a sufficient amount of basic material to produce a substantially neutral solution, applying the solution to a surface and drying.

ARTHUR M. HOWALD.